(12) United States Patent
Igarashi et al.

(10) Patent No.: US 9,236,612 B2
(45) Date of Patent: Jan. 12, 2016

(54) POSITIVE ELECTRODE MIXTURE FOR NONAQUEOUS BATTERY AND POSITIVE ELECTRODE STRUCTURE

(75) Inventors: Tamito Igarashi, Tokyo (JP); Kuniyuki Saito, Tokyo (JP); Mitsuyasu Sakuma, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 607 days.

(21) Appl. No.: 12/742,731

(22) PCT Filed: Nov. 12, 2008

(86) PCT No.: PCT/JP2008/070591
§ 371 (c)(1),
(2), (4) Date: Jun. 18, 2010

(87) PCT Pub. No.: WO2009/063907
PCT Pub. Date: May 22, 2009

(65) Prior Publication Data
US 2010/0266882 A1    Oct. 21, 2010

(30) Foreign Application Priority Data
Nov. 14, 2007 (JP) ................................ 2007-295675

(51) Int. Cl.
*H01M 4/60* (2006.01)
*H01M 4/62* (2006.01)
(Continued)

(52) U.S. Cl.
CPC .............. *H01M 4/62* (2013.01); *H01M 4/043* (2013.01); *H01M 4/131* (2013.01); *H01M 4/1391* (2013.01); *H01M 4/623* (2013.01); *H01M 4/625* (2013.01); *Y02E 60/122* (2013.01)

(58) Field of Classification Search
CPC .......... H01M 4/623; H01M 4/60; H01M 4/62
USPC ................... 429/121–347, 212, 215
See application file for complete search history.

(56) References Cited

U.S. PATENT DOCUMENTS 6,200,703 B1    3/2001 Kashio et al.
6,551,744 B1 *  4/2003 Ohzuku et al. ............... 429/223
(Continued)

FOREIGN PATENT DOCUMENTS

JP    09-306502    11/1997
JP    2001-035495   2/2001
(Continued)

OTHER PUBLICATIONS
Ishii et al. JP 2001-273895. English machine translation by EPO.*
(Continued)

*Primary Examiner* — Kenneth Douyette
*Assistant Examiner* — James Lee
(74) *Attorney, Agent, or Firm* — Birch, Stewart, Kolasch & Birch, LLP

(57) ABSTRACT

A positive electrode mixture for nonaqueous batteries, is formed by adding 0.5 to 10 wt. parts of an organic acid per 100 wt. parts of an electroconductive additive, to a mixture of a composite metal oxide as a positive electrode active substance, a higher order-structured carbon black as the electroconductive additive, a binder of a fluorine-containing copolymer of at least three comonomers including vinylidene fluoride, tetrafluoroethylene and a flexibility-improving fluorine-containing monomer, and an organic solvent. Further, the mixture is applied on at least one side of an electroconductive sheet, and then dried and compressed to form a positive electrode mixture layer. As a result, it is possible to provide a positive electrode structure having a thick and sound positive electrode mixture layer of a high energy density.

10 Claims, 1 Drawing Sheet

(51) Int. Cl.
*H01M 4/04* (2006.01)
*H01M 4/131* (2010.01)
*H01M 4/1391* (2010.01)

(56) References Cited

U.S. PATENT DOCUMENTS

| | | | |
|---|---|---|---|
| 6,653,019 B1 * | 11/2003 | Shimamura et al. | 429/218.1 |
| 2005/0158546 A1 | 7/2005 | Shizuka | |
| 2006/0263687 A1 | 11/2006 | Leitner et al. | |
| 2007/0207384 A1 | 9/2007 | Nakura | |
| 2009/0257171 A1 * | 10/2009 | Yamazaki et al. | 361/502 |

FOREIGN PATENT DOCUMENTS

| | | |
|---|---|---|
| JP | 2001-167767 | 6/2001 |
| JP | 2001-273895 | 10/2001 |
| JP | 3540097 | 4/2004 |
| JP | 2006-527461 | 11/2006 |
| JP | 2007-018874 | 1/2007 |
| JP | 2007-141527 | 6/2007 |
| JP | 2007-214138 | 8/2007 |
| JP | 2007-220475 | 8/2007 |
| JP | 2007-242303 | 9/2007 |
| WO | 2005112151 | 11/2005 |

OTHER PUBLICATIONS

International Preliminary Report on Patentability for corresponding International Application PCT/JP2008/070591, Jun. 29, 2010.

International Search Report for PCT/JP2008/070591 dated Feb. 17, 2009.

* cited by examiner

POSITIVE ELECTRODE MIXTURE FOR NONAQUEOUS BATTERY AND POSITIVE ELECTRODE STRUCTURE

TECHNICAL FIELD

The present invention relates to a (coating) mixture suitable for forming a positive electrode structure of a nonaqueous battery, especially lithium ion battery, and a positive electrode structure formed therefrom.

BACKGROUND ART

Nonaqueous battery, especially lithium ion batteries, have characteristics of a small size, a light weight and a high energy density, and are used widely as a main power supply of small information-and-telecommunication instruments, such as a cellular phone and a personal computer, and also they are being adopted as a power supply of an electric vehicle or a hybrid vehicle from the viewpoints of resource and environmental problems.

The electrodes (a positive electrode and a negative electrode) of such a nonaqueous battery, are formed by applying an electrode mixture slurry obtained by mixing a binder (binding agent) with powdery electrode-forming materials, such as an electrode active substance and an optional electroconductive additive, dissolving or dispersing the mixture in an appropriate solvent to form an electrode mixture slurry, and applying the mixture slurry on an electroconductive substrate to form a composite electrode layer. The binder is required to show a durability against a nonaqueous electrolytic solution obtained by dissolving an electrolytes, such as $LiPF_6$ or $LiClO_4$, in a nonaqueous solvent, such as ethylene carbonate or propylene carbonate, and fluorine-containing polymers, such as tetrafluoroethylene polymer, styrene-butadiene copolymers, etc., have been used conventionally, whereas vinylidene fluoride polymers are being used widely in recent years, because of a smaller resistivity and good film-forming property.

However, in a nonaqueous battery, especially a lithium ion battery, the desire for a smaller size, a smaller weight and a higher energy density, is increasing in recent years, and some problems accompanying it are also recognized. Particularly, for realizing a smaller weight and a higher energy density, it becomes necessary to form a thick electrode mixture layer on an electroconductive substrate and to increase the proportion of the electrode active substance in the battery volume, whereas this is accompanied with an embrittlement of the electrode mixture layer, so that the electrode mixture layer is liable to collapse easily when subjected to deformation. Furthermore, in case where the electrode mixture layer is densified by pressing, the liability becomes more pronounced. The collapse of the mixture layer leads to short circuit between the electrodes and should be avoided strictly. Although these problems are not so serious with respect to a negative electrode mixture using a carbon or graphite-based active substance which has a certain degree of flexibility, but are liable to be pronounced about the positive electrode mixture which uses an active substance of lithium-based composite metal oxide which per se has little flexibility or lubricity and further includes an electroconductive additive.

Hitherto, several proposals have been made about such a positive electrode mixture. For example, there have been proposed a positive electrode mixture which comprises, in addition to a mixture of an active substance comprising a lithium nickel composite metal oxide, an electroconductive additive, a binder and a solvent, 0.1 to 3 wt. parts of an organic acid having a basicity of two or more per 100 wt. parts of the active substance (Patent document 1 below); and a positive electrode mixture for nonaqueous batteries which includes an organic acid in addition to a mixture of a positive electrode active substance of a composite metal oxide, an electroconductive additive, a vinylidene fluoride polymer, and an organic solvent (Patent document 2 below). However, even by using these positive electrode mixtures, there has not been realized a sufficiently thick positive electrode of a high energy density.

[Patent document 1] JP-A 2001-35495
[Patent document 2] JP-B 3540097

DISCLOSURE OF INVENTION

Accordingly, a principal object of the present invention is to provide a positive electrode mixture capable of forming a positive electrode structure for nonaqueous batteries structural which is sound structurally and with respect to performances even if its energy density is maximized to the utmost, and also such a positive electrode.

According to the present invention, there is provided a positive electrode mixture for nonaqueous batteries, comprising: a mixture of a composite metal oxide as a positive electrode active substance, a higher order-structured carbon black as an electroconductive additive, a binder comprising a fluorine-containing copolymer of at least three comonomers including vinylidene fluoride, tetrafluoroethylene, and a flexibility-improving fluorine-containing monomer, and an organic solvent; and 0.5 to 10 wt. parts of an organic acid added to the mixture per 100 wt. parts of the electroconductive additive.

According to the present invention, there is also provided a positive electrode structure for nonaqueous batteries, comprising: an electroconductive sheet, and a dried and compressed coating layer of the above positive electrode mixture disposed on at least one side of the electroconductive sheet.

Some description is made about the history through which the present inventors have studied with the above-mentioned object, and reached the present invention. According to the present inventors, in order to increase the energy density per unit area and per unit volume of a positive electrode as much as possible, it is preferred to form as thick a positive electrode mixture layer as possible and to raise the proportion of the active substance in the positive electrode. However, such modification inevitably leads to the embrittlement of the positive electrode mixture layer after the coating and drying, and is liable to result in a detrimental loss of positive electrode performances due to crack or collapse of the positive electrode mixture layer at the time of compression for increasing the energy density and optional further winding of the positive electrode. According to the study, in order to attain a positive electrode of a higher energy density without causing the embrittlement of the mixture layer, the present inventors thought it desirable, (a) based on the use of a composite metal oxide which is excellent in characteristics as the positive electrode active substance, to use (b) a binder comprising a fluorine-containing copolymer of at least three comonomers including vinylidene fluoride, tetrafluoroethylene, and a flexibility-improving fluorine-containing monomer, which shows a good binder performance even at a small amount, and (c) an electroconductive additive comprising a higher order-structured carbon black which shows a high conductivity-imparting effect even at a small amount, and tried to form a thick positive electrode layer based on the thought. However, when such an electroconductive additive comprising higher order-structured carbon blacks is used, unlike in the case where the acetylene black used widely is used as an electroconductive additive (after-mentioned Comparative Example 2), the resultant layer obtained by applying and drying the mixture on an electroconductive substrate causes a crack therein, and subsequent compression or winding becomes impossible, or caused remarkable crack or collapse (after-mentioned Comparative Examples 1, 3, 5, and 6). According to a study including SEM (scanning electron microscope) observation of the present inventors, it has been found that such difficulties caused in the case where higher order-structured carbon black is used as the electroconductive additive, are attributable to floating of the electroconductive-additive at an upper part in the applied mixture layer to result in a layer rich in the electroconductive additive in the thick mixture layer, so that the surface crack occurs as the mixture is dried. As a result of further study, the present inventors have found it effective to add a small amount of organic acid to a positive electrode mixture including higher order-structured carbon black as an electroconductive additive for preventing the floating of the carbon black at the time of application of the positive electrode mixture on the electroconductive substrate, thereby effectively preventing the crack at the time of drying for formation of a thick positive electrode mixture layer to succeed in formation of a thick positive electrode of a high energy density.

BEST MODE FOR PRACTICING THE INVENTION

Figure 1:
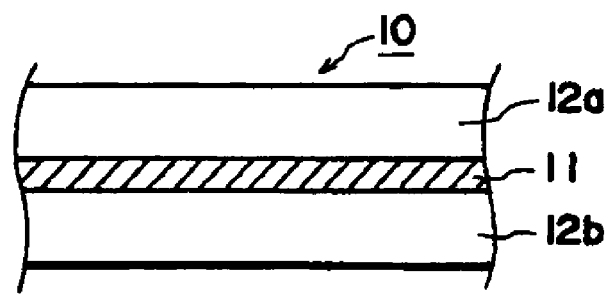
FIG. 1 is a partial sectional view of an embodiment of the positive electrode structure of the present invention.

Hereinbelow, the positive electrode mixture for nonaqueous batteries and positive electrode structure of the present invention are described sequentially with respect to preferred embodiments thereof.

(Composite Metal Oxide)

As a composite metal oxide used as positive active substance used in the present invention, it is preferable to use lithium cobalt composite oxide (typically $LiCoO_2$) which is known to have a high capacity, and in addition thereto, lithium manganese composite oxide (typically $LiMn_2O_4$) and lithium iron composite oxide (typically $LiFePO_4$) which are excellent in safety and also have an advantage of low prices, lithium nickel composite oxide (typically $LiNiO_2$) which has a high energy density. Moreover, it is also preferable to use a composite metal oxide denoted by the formula:

$$LiX_{1-\alpha-\beta}Y_\alpha Z_\beta O_2$$

(wherein X, Y and Z represent mutually different metal species selected from Ni, Co, Al and Mn; $0\leq\alpha\leq1$, $0\leq\beta\leq1$, $0\leq\alpha+\beta\leq1$) which is a solid solution of the above-mentioned composite metal oxides. Moreover, it is preferred to neutralize such a composite metal oxide in advance to remove a function thereof of promoting gelling as is recognized in Patent document 2.

(Electroconductive Additive)

The electroconductive additive used together with the positive electrode active substance comprising a composite metal oxide in the present invention, comprises higher order-structured carbon black. Here, "higher order structure" means a structure in which primary particles (including those having a hollow structure) constituting the carbon black forms a chain structure. The higher order-structured carbon black used in the present invention is characterized by a specific surface area (SSA) by the BET adsorption method of 500 $m^2/g$ or more and a dibutyl phthalate (DBP) oil absorption of 300 ml/100 g or more as the representative properties. As a result of these properties and higher order structure, the higher order-structured carbon black shows a higher conductivity-imparting effect even at a small quantity, compared with acetylene black (specific surface area=around 60 $m^2/g$ and a DBP oil absorption of about 200 ml/100 g) and graphite-based electroconductive additive which are typical examples of conductive carbon black, and is particularly suitable for the object of the present invention of forming a thick positive electrode of a high energy density, by increasing the amount of the positive electrode active substance as much as possible in the mixture. Commercially available examples thereon may include: "Carbon ECP" (specific surface area=800 $m^2/g$, DBP oil absorption=360 ml/100 g) made by Ketjen Black International K.K., and "Printex XE2" (specific surface area=950 $m^2/g$, DBP oil absorption=380 ml/100 g) made by Degussa A.G., etc. The higher order-structured carbon black may be used in a quantity required according to the conductivity required of the positive electrode by the present invention, but may preferably be used in a quantity of generally 0.1 to 10 wt. parts, particularly 0.5 to 8 wt. parts, per 100 wt. parts of the positive electrode active substance.

(Fluorine-Containing Copolymer)

In addition to the above-mentioned composite metal oxide as the positive electrode active substance and the higher order-structured carbon black as the electroconductive additive, the positive electrode mixture of the present invention contains a binder comprising a fluorine-containing copolymer of at least three comonomers including vinylidene fluoride, tetrafluoroethylene, and a flexibility-improving fluorine-containing monomer. Such a fluorine-containing copolymer shows a good binder characteristic even at a small quantity, and can provide a positive-electrode-mixture layer which is excellent in cycle performance and flexibility. Among the copolymerization components, vinylidene fluoride is required to secure an adhesive property of the resultant copolymer with the positive electrode active substance, other powdery electrode materials, and the electroconductive substrate, and tetrafluoroethylene is required in order to provide a good durability against the electrolytic solution. Moreover, as the flexibility-improving fluorine-containing monomer is used a fluorine-containing compound which has an atomic group or side chain obstructing the formation of a crystal structure originating from the vinylidene fluoride and tetrafluoroethylene. Specific examples thereof may include: hexafluoropropylene, a perfluoroalkyl vinyl ether, etc., among which hexafluoropropylene and perfluoromethyl vinyl ether are preferably used. These three components may preferably be used to provide a terpolymer of 45-75 mol. % of vinylidene fluoride, 20-55 mol. % of tetrafluoroethylene and 1-35 mol. % of a flexibility-improving fluorine-containing monomer (giving a total of 100 mol %), but it is possible to form a copolymer of 4 or more components having better adhesiveness by adding, e.g., up to 5 mol. % of another polar monomer within an extent of retaining the lower limit of each of the above three components. Examples of such a polar monomer may include: monoesters of unsaturated dibasic acids, such as monomethyl maleate, vinylene carbonate, epoxy group-containing vinyl monomers, maleic anhydride, and perfluoro-2-(2-fluoro-sulfonyl-ethoxy)propyl vinyl ether.

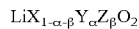

The fluorine-containing copolymer may preferably have a solution viscosity of 10 wt. % NMP solution thereof in a range of 0.1-100 Pa·s as measured at 30° C. and a shear rate of 2 sec$^{-1}$ by using an E-type viscometer as a measure of average molecular weight.

Such a fluorine-containing copolymer can be preferably obtained according to a usual method by emulsion polymerization or suspension polymerization.

The above-mentioned fluorine-containing copolymer is used in a relatively small quantity in order to maintain a high content of positive electrode active substance in the positive electrode mixture. More specifically, it is preferred to use it in the range of 2 to 5 wt. parts, particularly 1 to 10 wt. parts per 100 wt. parts, of the positive electrode active substance.

The positive electrode mixture of the present invention contains a preferably polar organic solvent capable of dissolving the above-mentioned fluorine-containing copolymer. Examples thereof may include: N-methyl-2-pyrrolidone (NMP), dimethylformamide, N,N-dimethyl-acetamide, N,N-dimethyl sulfoxide, hexamethylphosphamide, dioxane, tetrahydrofuran, tetramethylurea, triethyl phosphate, trimethyl phosphate, acetone, methyl ethyl ketone, and tetrahydrofuran.

These organic solvents may be used singly or in mixture of two or more species so as provide a proportion of 0.1 to 40 wt. parts, particularly 1 to 20 wt. parts, of the fluorine-containing copolymer per 100 wt. parts of the organic solvent. The fluorine-containing copolymer is dissolved by using the organic solvent, and into the resultant solution, the positive electrode active substance and the electroconductive additive are dispersed to provide a positive electrode mixture in a slurry form.

According to the present invention, in the positive electrode mixture slurry, an organic acid is added in order to improve the dispersibility of the electroconductive additive composed of a higher order-structured carbon black. Preferred examples of the organic acid may include: acrylic acid, formic acid, citric acid, acetic acid, oxalic acid, lactic acid, pyruvic acid, malonic acid, propionic acid, maleic acid, citraconic acid, butyric acid, etc., among which oxalic acid and maleic acid may be used particularly preferably. These organic acids may preferably be added into the positive electrode mixture slurry at a rate of 0.5 to 10 wt. parts, particularly 0.5 to 8 wt. parts, per 100 wt. parts of the electroconductive additive. Below 0.5 wt. part, the addition effect is scarce, whereas above 8 wt. parts, the effect thereof is saturated, and the viscosity of the positive electrode mixture slurry is rather increased to result in a surface roughness of the dried positive electrode mixture layer. This tendency is increased particularly in excess of 10 wt. parts. For a similar reason, it is preferred to suppress the addition amount of the organic acid to below 0.09 wt. part per 100 wt. parts of the positive electrode active substance.

The positive electrode mixture (slurry) of the present invention is obtained by mixing the positive electrode active substance comprising the composite metal oxide, the electroconductive additive comprising the higher order-structured carbon black, the binder comprising the fluorine-containing copolymer, the organic solvent and the organic acid, in any arbitrary order, into a slurry form.

By referring to FIG. 1 as a sectional view, for example, the positive electrode mixture slurry formed as mentioned above may be applied onto one or both sides, preferably both sides, of a 5 to 100 μm-thick, preferably 5 to 20 μm-thick, electroconductive sheet 11 in the form of a foil or net of a metal, such as iron, stainless steel, steel, copper, aluminum, nickel, titanium, etc., at a coating amount (dry) of 300-1000 g/m$^2$ preferably 400-650 g/m$^2$, and dried, e.g., at 50-170° C., followed by compressing or rolling with a roller etc., to form positive electrode mixture layers 12a, 12b, whereby a positive electrode 10 for nonaqueous battery is formed. Particularly, in the present invention aiming at the formation of a thick positive electrode mixture layer, it is preferred to form a mixture layer after drying in a thickness (per one side) of 150-500 μm, particularly 200-350 μm, and compress the layer for achieving a thickness reduction by ordinarily 25-35%, thereby forming a positive electrode mixture layer 12a, 12b of 100-320 μm, particularly 120-230 μm.

In order to provide a nonaqueous battery of a coin shape, a square shape, or a paper type, the positive electrode structure of the present invention including the thus dried and compressed positive electrode mixture layer may be laminated with a negative electrode and a separator to form a laminate electricity-generating element. On the other hand, in order to provide a nonaqueous battery of a cylindrical or a rectangular shape, the positive electrode structure may be laminated with a negative electrode and a separator to form an electricity-generating element, which is then wound in a cylindrical or rectangular form to form a corresponding shape of electricity-generating element. The positive electrode structure of the present invention having an electrode mixture layer, which is thick and has a high energy density but retains a good flexibility, is particularly suitable for forming such an electricity-generating element of a winding type.

Figure 2:
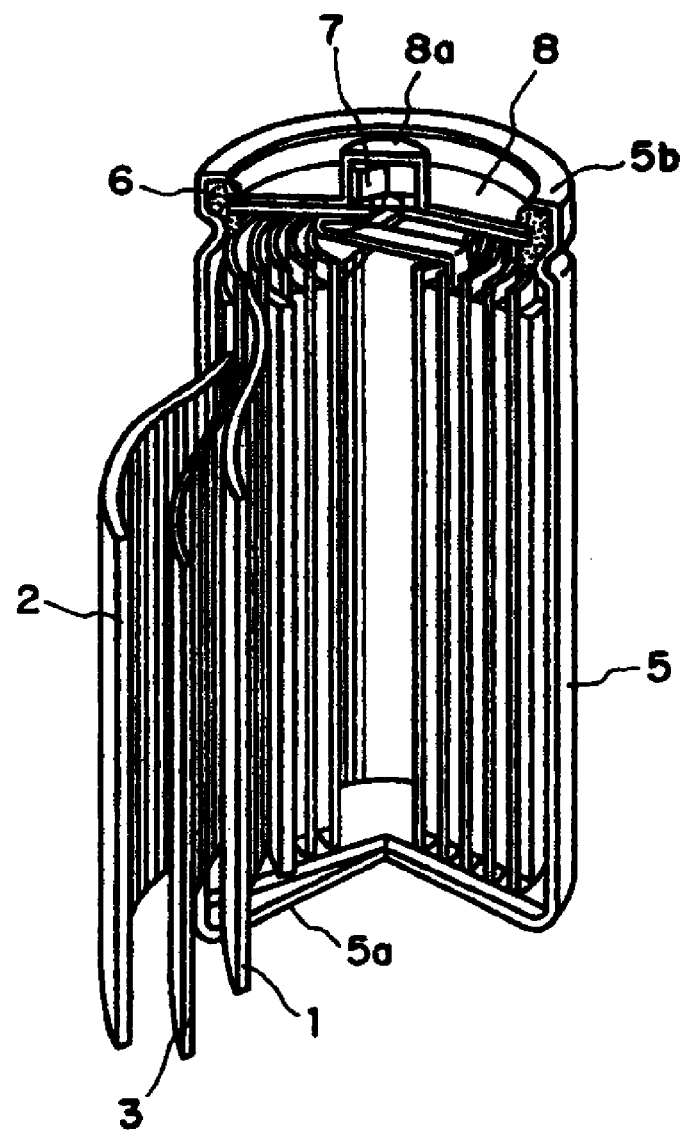
FIG. 2 is a partially exploded perspective view of a cylindrical nonaqueous solvent rechargeable battery including an embodiment of the positive electrode structure of the present invention in a wound state.

FIG. 2 is a partially exploded perspective view of such a cylindrical lithium secondary battery as an example of the nonaqueous battery including a positive electrode structure of the present invention as mentioned above.

More specifically, the secondary battery basically includes a laminate structure including a positive electrode 1, a negative electrode 2 and a separator 3 disposed between the positive and negative electrodes 1 and 2 and comprising a fine porous film of a polymeric material, such as polypropylene or polyethylene, impregnated with an electrolytic solution. The laminate structure is wound in a vortex shape to form an electricity-generating element which is housed within a metal casing 5 having a bottom constituting a negative electrode terminal 5a. In the secondary battery, the negative electrode 2 is electrically connected with the negative electrode terminal 5a, and the uppermost portion of the battery is composed by disposing a gasket 6 and a safety valve 7 covered with a top plate 8 having a projection constituting a positive electrode terminal 8a electrically connected to the positive electrode 1. Further, the uppermost rim 5b of the casing is crimped toward the inner side to form an entirely sealed cell structure. The positive electrode 1 assumes, e.g., a structure of the electrode structure 10 shown in FIG. 1.

The negative electrode 2 can also be formed as an electrode structure which has a fundamentally similar layer structure as the positive electrode. For example, it is possible to preferably use an electrode structure as a negative electrode formed by using a negative electrode mixture using graphite, activated carbon or a carbonaceous substance obtained by calcination and carbonization of a phenol resin, a pitch, etc., instead of the positive electrode active substance or the positive electrode active substance and the electroconductive additive in the positive electrode mixture of the present invention, as an electrode active substance, and similarly applying and drying the negative electrode mixture on one or both sides of an electroconductive sheet.

As the nonaqueous electrolytic solution impregnating the separator 3, it is possible to use one obtained by dissolving an electrolyte, such as a lithium salt, for example, in a nonaqueous solvent (organic solvent).

Here, as electrolytes, there are $LiPF_6$, $LiAsF_6$, $LiClO_4$, $LiBF_4$, $CH_3SO_3Li$, $CF_3SO_3Li$, $LiCl$, $LiBr$, etc. Further, as an organic solvent for the electrolyte, it is possible to use propylene carbonate, ethylene carbonate, 1,2-dimethoxy ethane, 1,2-diethoxyethane, dimethyl carbonate, diethyl carbonate, methyl ethyl carbonate, gamma-butyrolactone, methyl propionate, ethyl propionates, or a mixture of these mixed solvents. These are however not exhaustive.

EXAMPLES

Hereinbelow, the present invention will be described more specifically based on Examples and Comparative Examples.
<Positive Electrode Active Substance>
$LiCoO_2$ ("Cellseed C-10N" made by Nippon Kagaku Kogyo K.K., average particle diameter of 12 μm) was used.
<Binder>
As binders, the following three species of fluorine-containing polymers were used:
Polymer A: A terpolymer of vinylidene fluoride 58.8 mol. %, tetrafluoroethylene 36.9 mol % and hexafluoropropylene 4.3 mol %; 10% NMP solution-viscosity=1.8 Pa·s (30° C., 2 $sec^{-1}$),
Polymer B: A terpolymer vinylidene fluoride 57.3 mol %, tetrafluoroethylene 38.2 mol %, and perfluoromethyl vinyl ether 4.5 mol %; 10% NMP solution-viscosity=0.65 Pa·s (30 t, 2 $sec^{-1}$),
Polymer C(Comparative Example): Vinylidene fluoride homopolymer; 10% NMP solution-viscosity=0.54 Pa·s (30° C., 2 $sec^{-1}$).
<Electroconductive Additive>
The following three species of carbon black were used:
Electroconductive-additive A: "Carbon ECP" made by Ketjen Black International K.K.; BET specific surface area (SSA)=800 $m^2/g$, DBP-oil-absorption=360 ml/100 g, primary particle diameter=30 nm,
Electroconductive additive B: "Printex XE2" made by Degussa A.G., SSA=950 $m^2/g$, DBP-oil-absorption=380 ml/100 g, primary particle diameter=30 nm,
Electroconductive additive C (Comparative Example): Acetylene black ("Denka Black" made by DENKI KAGAKU KOGYO K.K.), SSA=61 $m^2/g$, DBP-oil-absorption=190 ml/100 g, primary particle diameter=42 nm.
Positive electrode mixtures and positive electrode structures were obtained as follows using the above-mentioned materials, respectively.

Example 1

$LiCoO_2$: 100 wt. parts, Electroconductive-additive A: 1 wt. part, Polymer A: 3 wt. parts, oxalic acid (organic acid): 0.005 wt. part (0.5 wt. part per 100 wt. parts of electroconductive-additive), and NMP (N-methyl-pyrrolidone) were mixed, and kneaded for 5 minutes by using a kneading machine ("AR-250" made by THINKY Corporation) to prepare an electrode mixture slurry having an adjusted solid matter concentration (($LiCoO_2$+electroconductive-additive+polymer)/slurry weight).
The above slurry was applied onto one side of 20 μm-thick aluminum foil by using a coating roller-type coater ("TOSMAC100 WI-E" by Toyo System Co. Ltd.), and dried at a line speed of 0.3 m/min. (in a drying furnace having a line length of 1 m) under the conditions of 130° C. and a wind velocity setting of 50%. The thus-obtained electrode exhibited a coating rate (=positive-electrode-mixture layer solid content weight per unit area) of 473 $g/m^2$ and a coating film (positive-electrode-mixture layer) thickness of 212 μm.

The thus-obtained electrode was cut down to a width of 2 cm and compressed under a pressure of 3 $t/cm^2$ by a desk hydraulic press machine to obtain an electrode having a coating film thickness of 133 μm.

Examples 2-8

Electrode mixture slurries and electrodes were obtained in the same manner as in Example 1 except for replacing the oxalic acid as an organic acid with oxalic acid or maleic acid in amounts of 0.012 to 0.10 wt. parts (1.2 to 10 wt. parts per 100 wt. parts of electroconductive additive), as shown in Table 1.

Example 9

An electrode mixture slurry and an electrode were obtained in the same manner as in Example 1 except for using Electroconductive additive B ("Printex XE2" made by Degussa) as an electroconductive additive instead of Electroconductive additive A (Ketjen Black) and using maleic acid 0.03 wt. part instead of the oxalic acid.

Example 10

An electrode mixture slurry and an electrode were obtained in the same manner as in Example 1 except for using Polymer B as a binder instead of Fluorine-containing-polymer A, and using maleic acid 0.012 wt. part instead of the oxalic acid.

Comparative Example 1

An electrode mixture slurry and an electrode were obtained in the same manner as in Example 1 except for using Polymer C as a binder instead of Fluorine-containing polymer A, and not adding the oxalic acid.

Comparative Example 2

An electrode mixture slurry and an electrode were obtained in the same manner as in Example 1 except for using Electroconductive additive C (acetylene black) instead of Electroconductive additive A, and not adding the oxalic acid.

Comparative Example 3

It was tried to obtain an electrode mixture slurry and an electrode in the same manner as in Example 1 except for not adding the oxalic acid, whereas the electrode mixture layer after the drying caused crack, and subsequent compression became impossible.

Comparative Example 4

It was tried to obtain an electrode mixture slurry and an electrode in the same manner as in Example 1 except for reducing the addition amount of the oxalic acid to 0.003 wt. part (0.3 wt. part per 100 wt. parts of electroconductive-additive), whereas the electrode mixture layer after the drying caused crack, and subsequent compression became impossible.

Comparative Example 5

It was tried to obtain an electrode mixture slurry and an electrode in the same manner as in Example 1 except for using Electroconductive additive B instead of Electroconductive additive A and not adding the oxalic acid, whereas the electrode mixture layer after the drying caused crack, and subsequent compression became impossible.

Comparative Example 6

It was tried to obtain an electrode mixture slurry and an electrode in the same manner as in Example 1 except for using Polymer B instead of Polymer A and not adding the oxalic acid, whereas the electrode mixture layer after the drying caused crack, and subsequent compression became impossible.

Comparative Example 7

It was tried to obtain an electrode mixture slurry and an electrode in the same manner as in Example 1 except for using maleic acid in an increased addition amount of 0.3 wt. part (30 wt. parts per 100 wt. parts of electroconductive-additive) instead of the oxalic acid, whereas the resultant electrode mixture slurry exhibited a lower fluidity and poor coating performance due to poor supply state to the coating roller.

Example 11

An electrode mixture slurry and an electrode were obtained in the same manner as in Example 1 except for increasing the amount of Electroconductive additive A to 2 wt. parts, and changing the oxalic acid addition amount to 0.03 wt. part (1.5 wt. parts per 100 wt. parts of electroconductive additive).

Comparative Example 8

An electrode mixture slurry and an electrode were obtained in the same manner as in Example 11 except for using Polymer C as a binder instead of Fluorine-containing polymer A, and not adding the oxalic acid.

Comparative Example 9

It was tried to obtain an electrode mixture slurry and an electrode in the same manner as in Comparative Example 8 except for using Polymer A instead of Fluorine-containing polymer C, whereas the electrode mixture layer after the drying caused crack, and subsequent compression became impossible.

The electrode mixture slurries and electrodes obtained in the above-mentioned Examples and the Comparative Examples were evaluated with respect to the items shown in the after-mentioned Table 1. Evaluation methods about some of the items are supplemented below.

<Coating Property of Slurry>

Evaluation was made by judging whether a sample slurry showed a good flowability as to allow a continuous supply to a coating roller.

<Slurry Viscosity>

It was measured by using an E-type viscometer ("RE80 type" made by Toki Sangyo Co. Ltd.) at 25° C. and a shear rate of 2 s$^{-1}$. Empirically, less than 15000 mPa·s represents a good coating property, and in a range of 15000-30000 mPa·s, coating is possible, but even in this viscosity range, the flowability of the slurry falls and smooth supplying of the slurry to a coating roller becomes impossible when its storage-modulus G' at an angular frequency of 0.1 rad/s exceeds 1000 Pa.

<Storage Modulus G'>

Dynamic Frequency Sweep Test was performed by using a rheometer ("ARES" made by TA Instruments, Inc.) as an auxiliary valuation standard of the coating property of a slurry. Measurement was made at 25° C. under conditions set to: Strain=0.75%, Initial Frequency=0.1 rad/s, Final Frequency=500 rad/s, and points/decade=5.

<Electrode States after Drying>

Presence or absence of surface crack was judged by observation with eyes. Empirically, if surface crack has occurred after drying, the electrodes is liable to exfoliate partially in the subsequent compression, assembly process for cell production, etc., thus being liable to cause short circuit in the cell.

<Surface Roughness of Electrode>

A sample electrode after drying was observed at a pitch of 0.1 μm in Z-direction with respect to a planar area of 746 μm×559 μm through an objective lens (×20) of a super-depth shape detecting microscope ("VK-8500" made by KEYENCE Corporation), and a surface roughness Ra (according to JIS B0601:1994) was measured by using a roughness analysis function of the above-mentioned microscope.

<Volume Resistivity of Coating Film after Pressing>

An electroconductive sheet was peeled off from a sample electrode after drying to leave a coating film (electrode mixture layer), which was then pressed to a bulk density comparable to that of the electrode mixture layer in the electrode and then subjected to measurement of volume resistivity by using a resistivity meter by the 4 probe method ("Loresta GP" made by Instruments Co., Ltd.).

<Windability of Electrode after Pressing>

A sample electrode after drying was cut down to a 2 cm width, a pressure equivalent to one applied in the press electrode formation was applied thereto to form an equivalent compression electrode. The electrode was wound about a round bar of 3 mm in diameter with its electroconductive sheet disposed inside to observe whether or not crack occurred in the coating film.

The outline and evaluation results of an above-mentioned Examples and Comparative Examples are inclusively shown in the following Table 1.

TABLE 1

| Example | Combination *2 | Compounding ratio | Organic acid species | Organic acid/ EC.Add. [wt. prt/ 100 wt. parts] | Slurry solid content [wt %] | Slurry applica- bility | Slurry viscosity [mPa · s] | S. modulus G' of slurry [Pa] |
|---|---|---|---|---|---|---|---|---|
| 1 | LiCoO2/EC.Add. A/Polymer A | 100/1/3 | Oxalic acid | 0.5 | 67.0 | Good | 11000 | 101 |
| 2 | LiCoO2/EC.Add. A/Polymer A | 100/1/3 | Oxalic acid | 1.2 | 67.0 | Good | 12625 | 240 |
| 3 | LiCoO2/EC.Add. A/Polymer A | 100/1/3 | Maleic acid | 1.2 | 67.0 | Good | 12625 | 109 |
| 4 | LiCoO2/EC.Add. A/Polymer A | 100/1/3 | Maleic acid | 2.4 | 67.0 | Good | 11750 | 172 |
| 5 | LiCoO2/EC.Add. A/Polymer A | 100/1/3 | Maleic acid | 3.0 | 67.0 | Good | 12600 | 141 |
| 6 | LiCoO2/EC.Add. A/Polymer A | 100/1/3 | Maleic acid | 8.0 | 67.0 | Good | 14000 | 373 |
| 7 | LiCoO2/EC.Add. A/Polymer A | 100/1/3 | Maleic acid | 10.0 | 67.0 | Fair | 15130 | 404 |
| 8 | LiCoO2/EC.Add. A/Polymer A | 100/1/3 | Oxalic acid | 10.0 | 67.0 | Fair | 15500 | 493 |
| 9 | LiCoO2/EC.Add. B/Polymer A | 100/1/3 | Maleic acid | 3.0 | 67.0 | Good | 9750 | 470 |
| 10 | LiCoO2/EC.Add. A/Polymer B | 100/1/3 | Maleic acid | 1.2 | 68.0 | Good | 11250 | 491 |

TABLE 1-continued

| | | | | | | | | | |
|---|---|---|---|---|---|---|---|---|---|
| Comp. 1 | LiCoO2/EC.Add. A/Polymer C | 100/1/3 | None | 0.0 | 69.0 | Good | 7750 | 122 | |
| Comp. 2 | LiCoO2/EC.Add. C/Polymer A | 100/1/3 | None | 0.0 | 67.5 | Good | 14625 | 62 | |
| Comp. 3 | LiCoO2/EC.Add. A/Polymer A | 100/1/3 | None | 0.0 | 67.0 | Good | 12100 | 11 | |
| Comp. 4 | LiCoO2/EC.Add. A/Polymer A | 100/1/3 | Oxalic acid | 0.3 | 67.0 | Good | 8500 | 36 | |
| Comp. 5 | LiCoO2/EC.Add. B/Polymer A | 100/1/3 | None | 0.0 | 67.0 | Good | 3625 | 9 | |
| Comp. 6 | LiCoO2/EC.Add. A/Polymer B | 100/1/3 | None | 0.0 | 68.0 | Good | 3000 | 2 | |
| Comp. 7 | LiCoO2/EC.Add. A/Polymer A | 100/1/3 | Maleic acid | 30.0 | 67.0 | Not good | 20250 | 1037 | |
| 11 | LiCoO2/EC.Add. A/Polymer A | 100/2/3 | Oxalic acid | 1.5 | 58.0 | Good | 14700 | 823 | |
| Comp. 8 | LiCoO2/EC.Add. A/Polymer C | 100/2/3 | None | 0.0 | 62.0 | Fair | 21000 | 824 | |
| Comp. 9 | LiCoO2/EC.Add. A/Polymer A | 100/2/3 | None | 0.0 | 59.0 | Fair | 21000 | 11 | |

| Example | Electrode state after drying | Coating rate [g/m2] | Thickness before press [μm] | Surface roughness Ra *1 [μm] | Thickness after press [μm] *1 | Volume resistivity after press [Ω-cm] *1 | Electrode windability *1 after press |
|---|---|---|---|---|---|---|---|
| 1 | Good | 473 | 212 | 8.7 | 133 | 67 | Good |
| 2 | Good | 464 | 216 | 9.5 | 139 | 56 | Good |
| 3 | Good | 455 | 212 | 7.6 | 129 | 86 | Good |
| 4 | Good | 464 | 218 | 9.5 | 137 | 59 | Good |
| 5 | Good | 466 | 220 | 10.1 | 131 | 81 | Good |
| 6 | Good | 478 | 223 | 9.5 | 136 | 38 | Good |
| 7 | Good | 483 | 221 | 11.9 | 139 | 37 | Good |
| 8 | Good | 445 | 207 | 12.9 | 123 | 35 | Good |
| 9 | Good | 472 | 215 | 8.8 | 130 | 42 | Good |
| 10 | Good | 468 | 222 | 10.3 | 135 | 40 | Good |
| Comp. 1 | Good | 457 | 192 | 10.2 | 129 | 67 | Cracked |
| Comp. 2 | Good | 465 | 225 | — | — | 4620 | — |
| Comp. 3 | Cracked | 457 | 208 | — | — | — | — |
| Comp. 4 | Cracked | 471 | 210 | — | — | — | — |
| Comp. 5 | Cracked | 463 | 235 | — | — | — | — |
| Comp. 6 | Cracked | 473 | 223 | — | — | — | — |
| Comp. 7 | (Coating failure) | 462 | 217 | — | — | — | — |
| 11 | Good | 458 | 243 | 10.4 | 149 | 6 | Good |
| Comp. 8 | Good | 465 | 228 | 23.0 | 142 | 9 | Cracked |
| Comp. 9 | Cracked | 458 | 254 | — | — | — | — |

*1 "—": Not evaluated.
*2 EC.Add.: Electroconductive additive

In view of the results shown in the above Table 1, all of Examples 1-6 and 9-10 according to the present invention, exhibited good results with respect to any viewpoints of coating properties of slurry, surface state of electrode after drying, and resistivity and windability of electrode after pressing.

On the other hand, with respect to Examples 7 and 8 wherein the addition amount of the organic acid was increased and Example 11 wherein the amount of higher order-structured carbon black was increased, there were observed tendencies of increase in slurry viscosity and in surface roughness of electrode, whereas they are within a permissible range, and particularly a remarkably low electrode resistance was obtained in Example 11 wherein an increased amount of higher order-structured carbon black was used. Accordingly, this is understood as particularly suitable for a use where a low electrode resistivity is thought much of, e.g., as in a use requiring a large current characteristic.

On the other hand, in Comparative Examples 1 and 8 using Polymer C (vinylidene fluoride homopolymer) as a binder, it was possible to obtain electrodes which were crack-free after drying without adding an organic acid, but the electrodes caused cracks in the electrode mixture layers when they were wound after pressing.

Moreover, in Comparative Example 2 using Electroconductive additive C (acetylene black), it was possible to obtain an electrodes which was crack-free after drying without adding an organic acid, but the electrode showed a remarkably larger electrode resistivity after pressing.

Furthermore, in Comparative Examples 3-6 and 9 wherein organic acids were not added or added only in smaller amounts, crack occurred in the electrode coating films after drying, and forming of a compression electrode became impossible. On the other hand, in Comparative Example 7 wherein the addition amount of an organic acid was excessive, a coating failure occurred with an increased slurry viscosity.

INDUSTRIAL APPLICABILITY

As described above, the present invention provides a mixture slurry comprising a composite metal oxide as a positive electrode active substance, a higher order-structured carbon black as an electroconductive additive, a binder comprising a fluorine-containing copolymer of at least three comonomers including vinylidene fluoride, tetrafluoroethylene, and a flexibility-improving fluorine-containing monomer and an organic solvent, and suitable for providing a thick positive electrode mixture layer containing a high content of the positive electrode active substance and therefore having a high energy density, while solving the problem of embrittlement of the positive electrode mixture layer accompanying the use of the higher order-structured carbon black by adding a small amount of organic acid. Therefore, it has become possible to provide a positive electrode mixture capable of providing a positive electrode mixture layer which is thick, has a high energy density and is also physically sound, and also a positive electrode structure having such a positive electrode mixture layer.

The invention claimed is:
1. A positive electrode structure for nonaqueous batteries, comprising: an electroconductive sheet and a 100-149 μm thick dried and compressed positive electrode mixture layer disposed on at least one side of the electroconductive sheet;
  wherein the positive electrode mixture layer has been formed by drying and compressing a mixture of a com- posite metal oxide as a positive electrode active substance, a higher order-structured carbon black as an electroconductive additive, a binder comprising a fluorine-containing copolymer of at least three comonomers including vinylidene fluoride, tetrafluoro-ethylene and a flexibility-improving fluorine-containing monomer selected from hexafluoropropylene and perfluoroalkyl vinyl ether, an organic solvent, and 0.5 to 10 wt. parts of an organic acid per 100 wt. parts of the electroconductive additive, wherein the higher order-structured carbon black has a specific surface area of at least 500 $m^2/g$ according to a BET method and a dibutyl phthalate oil absorption of at least 300 ml/100 g, and the dried and compressed positive electrode mixture layer exhibits a crack-free windability about a round bar of 3 mm in diameter.

2. The positive electrode structure according to claim 1, wherein the electroconductive additive is contained in 0.1 to 10 wt. parts per 100 wt. parts of the positive electrode active substance.

3. The positive electrode structure according to claim 1, wherein the fluorine-containing copolymer is contained in 1 to 10 wt. parts per 100 wt. parts of the positive electrode active substance.

4. The positive electrode structure according to claim 1, wherein the organic acid is at least one member selected from the group consisting of acrylic acid, formic acid, citric acid, acetic acid, oxalic acid, lactic acid, pyruvic acid, malonic acid, propionic acid, maleic acid, citraconic acid, and butyric acid.

5. The positive electrode structure according to claim 4, wherein the organic acid is selected from oxalic acid and maleic acid.

6. The positive electrode structure according to claim 1, wherein the composite metal oxide has been neutralized in advance.

7. The positive electrode structure according to claim 1, in a further wound state.

8. The positive electrode structure according to claim 1, wherein the binder comprises a fluorine-containing copolymer selected from the group consisting of copolymers of vinylidene fluoride, and tetrafluoro-ethylene with at least one flexibility-improving fluorine-containing monomer selected from hexafluoropropylene and perfluoroalkyl vinyl ether.

9. The positive electrode structure according to claim 1, wherein the dried and compressed positive electrode mixture layer has a thickness of 123-149 μm.

10. The positive electrode structure according to claim 8, wherein the dried and compressed positive electrode mixture layer has a thickness of 123-149 μm.

* * * * *